United States Patent
Wada

(10) Patent No.: US 7,593,610 B2
(45) Date of Patent: Sep. 22, 2009

(54) MULTI-MODE OPTICAL COHERENCE DEVICE AND FABRICATION METHOD THEREOF

(75) Inventor: Hiroshi Wada, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 0 days.

(21) Appl. No.: 11/607,992

(22) Filed: Dec. 4, 2006

(65) Prior Publication Data

US 2007/0127868 A1    Jun. 7, 2007

(30) Foreign Application Priority Data

Dec. 6, 2005    (JP) .............................. 2005-351802

(51) Int. Cl.
G02B 6/26 (2006.01)
B02B 6/42 (2006.01)
B02B 6/10 (2006.01)

(52) U.S. Cl. .............................. 385/39; 385/28; 385/29; 385/129

(58) Field of Classification Search .................. 385/29, 385/39, 28, 37, 129–132
See application file for complete search history.

(56) References Cited

U.S. PATENT DOCUMENTS

| | | | |
|---|---|---|---|
| 5,142,596 A * | 8/1992 | Mizuuchi et al. ............... | 385/43 |
| 5,563,968 A | 10/1996 | Pennings et al. | |
| 5,640,474 A * | 6/1997 | Tayag .......................... | 385/43 |
| 6,160,945 A * | 12/2000 | Rhee et al. .................. | 385/129 |
| 6,798,795 B2 * | 9/2004 | Yoo .............................. | 372/20 |
| 6,944,368 B2 * | 9/2005 | Kimerling et al. ............. | 385/28 |
| 7,253,077 B2 * | 8/2007 | Ten Berge et al. .......... | 438/401 |
| 2004/0114872 A1 * | 6/2004 | Nagai ........................... | 385/50 |
| 2004/0131310 A1 * | 7/2004 | Walker ......................... | 385/29 |
| 2004/0140476 A1 * | 7/2004 | Hamamoto .................. | 257/100 |
| 2005/0095741 A1 * | 5/2005 | Johnstone et al. ............. | 438/31 |
| 2007/0003183 A1 * | 1/2007 | Shiba et al. .................... | 385/14 |

FOREIGN PATENT DOCUMENTS

JP    2001215452    8/2001

* cited by examiner

Primary Examiner—Uyen Chau N Le
Assistant Examiner—Rhonda S Peace
(74) Attorney, Agent, or Firm—Volentine & Whitt, P.L.L.C.

(57) ABSTRACT

In an MMI device with which a plurality of narrow width single-mode waveguides are provided at both ends of a multimode waveguide M, and light introduced into one single-mode waveguide on the input side is interfered in the multi-mode waveguide to be emitted from two single-mode waveguides on the output side, a wall face perpendicular to the optical axis direction that is not provided with a single-mode waveguide is formed with an inclination being given in the thickness direction, at both ends of the multimode waveguide. Thereby, the light which is incident on the wall face is reflected toward the substrate side. In this case, because the angle of incidence into the substrate is small, almost all of the light is radiated into the inside of the substrate without being returned to the single-mode waveguide on the incident side. Therefore, an MMI device which is capable of completely eliminating the return of the reflected light with a simple structure, and a manufacturing method for the same are provided.

3 Claims, 3 Drawing Sheets

MULTI-MODE OPTICAL COHERENCE DEVICE AND FABRICATION METHOD THEREOF

CROSS-REFERENCE TO RELATED APPLICATION

This application claims priority under 35 USC 119 from Japanese Patent Application No. 2005-351802, the disclosure of which is incorporated by reference herein.

BACKGROUND OF THE INVENTION

1. Field of the Invention

The present invention relates to an optical multimode interference device (hereinafter called an "MMI" device), and a manufacturing method for the same, to be used in optical communication, optical switching, optical wiring, and the like.

2. Description of the Related Art

FIG. 2A and FIG. 2B shows a plan view illustrating the structure of a conventional MMI device. Literature that discloses the conventional art includes Japanese Patent Laid-Open Publication No. 2001-215452, and U.S. Pat. No. 5,563,968.

With the conventional MMI device as shown in FIG. 2A, for example, narrow width single-mode waveguides A, B are provided at one end in a longitudinal direction of a rectangular parallelepiped forming a waveguide for light, and at the other end, narrow width single-mode waveguides C, D are provided. Between the single-mode waveguides A, B and the single-mode waveguides C, D, a broad width multimode waveguide M is provided. In addition, between the single-mode waveguides A, B, an end face T1 is formed perpendicularly to the single-mode waveguides A, B. In addition, between the single-mode waveguides C, D, an end face T2 is formed perpendicularly to the single-mode waveguide C, D.

With such an MMI device, light which is introduced into the single-mode waveguide A is coupled into a plurality of multimodes in the broad width multimode waveguide M, and is emitted into the single-mode waveguides C, D on the light emission side, being demultiplexed by the interference effect between the multimodes. Thereby, the MMI device performs the function of a demultiplexer. In addition, it also functions as a multiplexer with which, when different light beams are introduced into the single-mode waveguides A, B, respectively, these light beams are multiplexed to be outputted from the single-mode waveguides C, D.

However, it is known, with the MMI device as shown in FIG. 2A, that the light which is introduced into the single-mode waveguide A and is passed through the multimode waveguide M is incident on the perpendicular end face T2 at the light emission end, and a part of the light is reflected to be returned to the single-mode waveguide A, resulting in the characteristics of the light source connected to this single-mode waveguide A being adversely influenced.

On the other hand, with the MMI device as shown in FIG. 2B, which is described in U.S. Pat. No. 5,563,968, the end face T1 between the single-mode waveguides A, B, and the end face T2 between the single-mode waveguides C, D are inclined with respect to the optical axis within the waveguide, whereby the light which is incident on the end face T2 is reflected at an angle in the plane of the waveguide, resulting in the reflected light being prevented from directly returning to the single-mode waveguide A.

However, with the MMI device as shown in FIG. 2B, although the influence of the reflection is reduced as compared to the MMI device as shown in FIG. 2A, the light reflected at the end face T2 on the light emission side is again reflected at the end face T1 on the incident side to be returned to the end face T2 on the light emission side, and such a reflection is repeated in the plane of the waveguide. Further, a part of the reflected light is returned to the single-mode waveguide A. Therefore, there has been presented a problem that, while compared to the MMI device as shown in FIG. 2A the influence of the reflection is reduced, the influence of the reflection cannot be completely eliminated.

SUMMARY OF THE INVENTION

The present invention has a purpose to provide an MMI device which is capable of completely eliminating the return of the reflected light with a simple structure, and a manufacturing method for the same.

The present invention provides an optical multimode interference device comprising a multimode waveguide having a single or a plurality of narrow width single-mode waveguides provided at both ends thereof, wherein light introduced into the single-mode waveguide(s) at an input side is interfered within the multimode waveguide and emitted from the single-mode waveguide(s) at an output side, and, at both ends of the multimode waveguide, a wall face that is perpendicular to an optical axis direction and is not provided with the single-mode waveguide(s) is formed so as to be inclined in a thickness direction.

With the present invention, at both ends of the multimode waveguide, a wall face perpendicular to the optical axis direction that is not provided with the single-mode waveguide is formed so as to have an inclination in the thickness direction. Thereby, the light incident on the wall face perpendicular to the optical axis direction is reflected toward the substrate surface side, irradiating onto the substrate surface at a small incident angle. Therefore, the light irradiating onto the substrate surface is not reflected at the substrate surface, but is irradiated into the substrate, and is not returned to the waveguide. Therefore, an effect that, with a simple structure, the return of the reflected light can be completely eliminated, is provided.

BRIEF DESCRIPTION OF THE DRAWINGS

A preferred exemplary embodiment of the present invention will be described in detail based on the following figures, wherein.

DETAILED DESCRIPTION OF THE INVENTION

The above-stated MMI device can be manufactured by the following steps.

First, on a crystal substrate that is a lower cladding layer, an optical waveguide layer, an upper cladding layer, and a mask layer for etching are sequentially formed. Next, the mask layer is patterned to form a mask pattern which corresponds to a multimode waveguide and single-mode waveguides. Further, this mask pattern is used as a mask for selectively wet etching the upper cladding layer to form it such that, at both ends of the multimode waveguide, a wall face which is not provided with a single-mode waveguide has a predetermined inclination angle along the crystal plane of the upper cladding layer. Further, the mask pattern is used as a mask for dry etching the upper cladding layer, the optical waveguide layer, and the crystal substrate to remove these to a predetermined thickness in a perpendicular direction, with the wall face of this optical waveguide layer maintaining the predetermined inclination angle.

The above and other purposes and novel features of the present invention will be more thoroughly clarified, if the description of the following preferred exemplary embodiment is read with reference to the attached drawings. However, the drawings are only for explanation, and do not limit the scope of the present invention.

Exemplary Embodiment 1

Figure 1A:
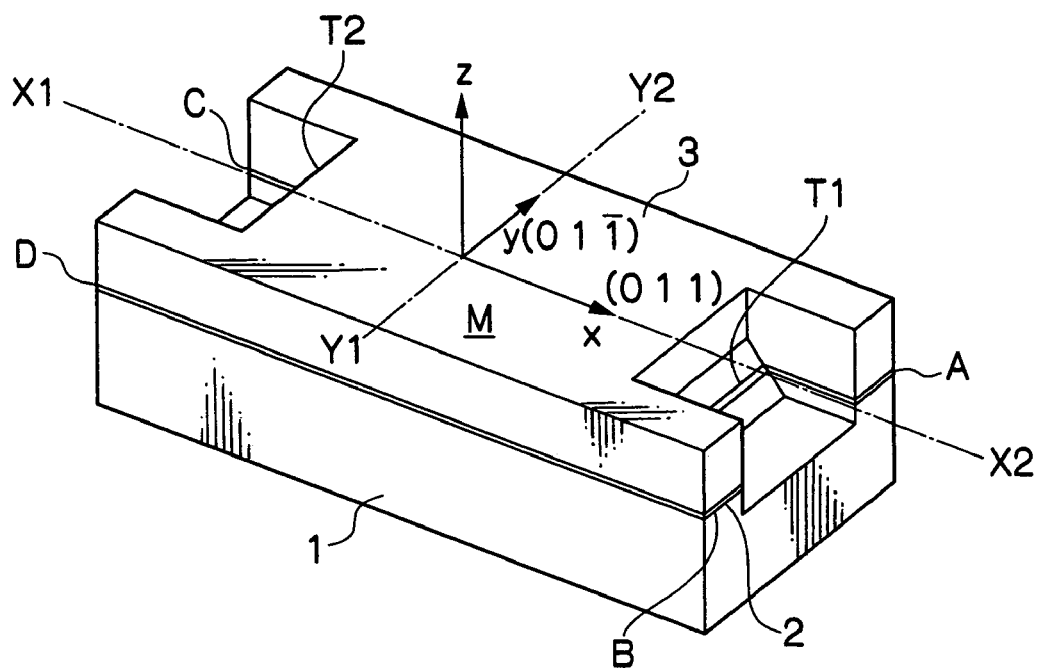
FIG. 1A is a structural diagram illustrating an MMI device of an exemplary embodiment of the present invention.
Figure 1B:
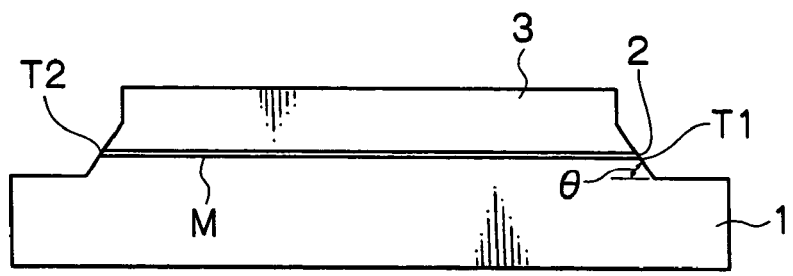
FIG. 1B is a structural diagram illustrating the MMI device of the exemplary embodiment of the present invention.
Figure 1C:
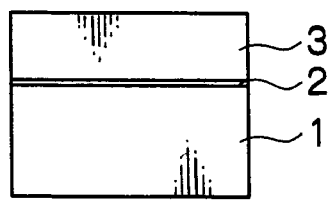
FIG. 1C is a structural diagram illustrating the MMI device of the exemplary embodiment of the present invention.
Figure 2A:
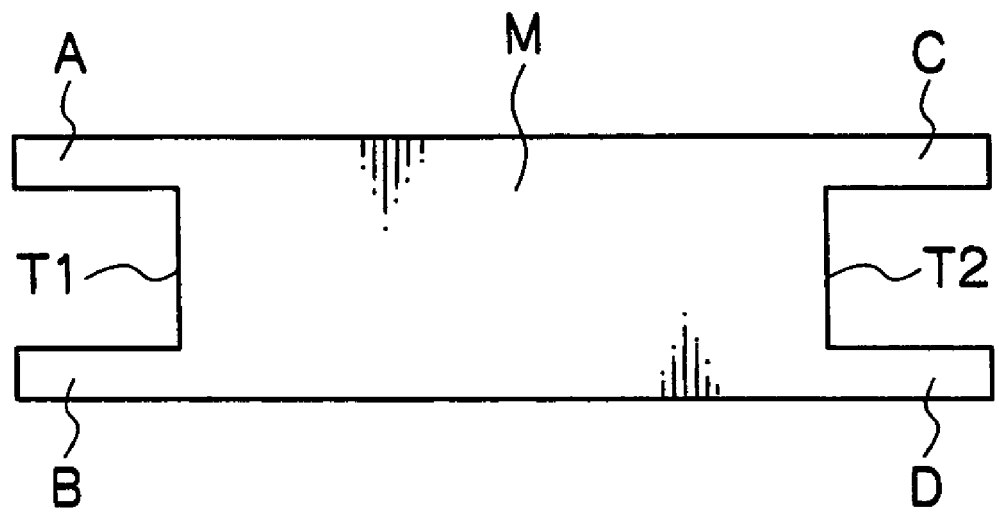
FIG. 2A is a plan view illustrating the structure of a conventional MMI device.
Figure 2B:
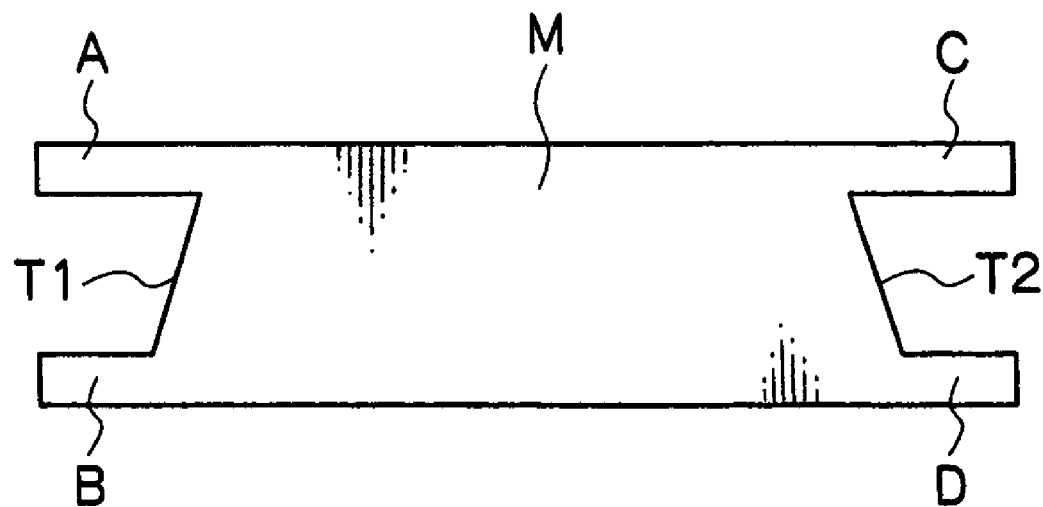
FIG. 2B is a plan view illustrating the structure of a conventional MMI device.

FIG. 1A to FIG. 1C are structural diagrams illustrating an MMI device of an exemplary embodiment of the present invention, FIG. 1A being a perspective view, FIG. 1B a sectional view of a portion along the line X1-X2 in FIG. 1A, and FIG. 1C a sectional view of a portion along the line Y1-Y2 in FIG. 1A.

This MMI device is formed by sequentially layering a light guiding layer 2 constituting a waveguide with an InGaAsP crystal having a thickness of about 0.5 μm on a substrate 1 made of an InP crystal which is a lower cladding layer, and an upper cladding layer 3 made of an InP crystal having a thickness of 2 to 4 μm, and working this to a geometry of a substantially rectangular parallelepiped having a length of 100 to 500 μm, and a width of about 15 to 100 μm.

As shown in FIG. 1A, the XY surface of the rectangular parallelepiped is set such that the X-axis direction corresponds to a plane defined by the crystal direction (0 1 1), and the Y-axis direction to a plane defined by the crystal direction (0 1 −1), and the X-axis direction, which is the longitudinal direction of this rectangular parallelepiped, i.e., the direction of the waveguide, is set so as to be the crystal direction (0 1 1).

The central portion of the waveguide is a multimode waveguide M constituted over the entire width in the Y-axis direction of the rectangular parallelepiped. At one end of the waveguide, an end face T1 which is formed by removing the central portion of the multimode waveguide M is provided, and the waveguide left on both sides of this end face T1 constitutes single-mode waveguides A, B. The single-mode waveguides A, B are formed to have a width of about 2 μm, which is the same as the wavelength of light, and to have a length of about 10 μm or more. On the other hand, the end face T1 provided between the single-mode waveguides A, B is formed slantwise such that the inclination angle θ is about 54.8 degrees with respect to the surface of the substrate 1. In other words, this end face T1 is formed with the wall face perpendicular to the optical axis being inclined in the thickness direction.

In addition, at the other end of the waveguide, single-mode waveguides C, D and an end face T2 are formed such that they are symmetrical with respect to the single-mode waveguides A, B and the end face T1.

FIG. 3A to FIG. 3D are process drawings illustrating the manufacturing method for the MMI device as shown in FIG. 1A to FIG. 1C. In these process drawings, the sectional view at the right-hand side for each step corresponds to the X1-X2 section in FIG. 1B, and the sectional view at the left-hand side to the Y1-Y2 section in FIG. 1C. Hereinbelow, with reference to FIG. 3A to FIG. 3C, the manufacturing method for the MMI device as shown in FIG. 1A to FIG. 1C will be described.

(1) Step 1

Figure 3A:
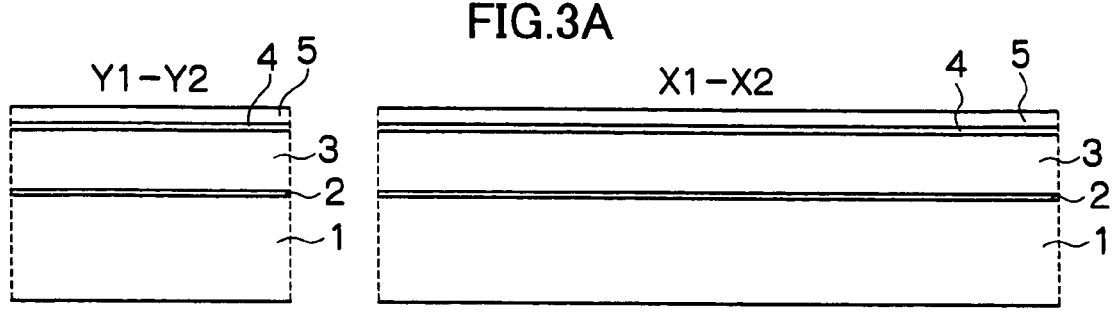
FIG. 3A is a process drawing illustrating the manufacturing method for the MMI device shown in FIG. 1A to FIG. 1C.

The substrate 1 made of an InP crystal which is formed such that the surface provides a plane defined by the crystal direction (0 1 1) and the crystal direction (0 1 −1) is prepared, and on the surface of this substrate 1, the light guiding layer 2 made of an InGaAsP crystal having a thickness of about 0.5 μm that constitutes the waveguide, the cladding layer 3 made of an InP crystal having a thickness of about 2 to 4 μm, the cap layer 4 made of an InGaAsP crystal or an InGaAs crystal that is used as a mask in the subsequent wet etching, and the mask layer 5 made of $SiO_2$ are sequentially formed as shown in FIG. 3A.

(2) Step 2

Figure 3B:
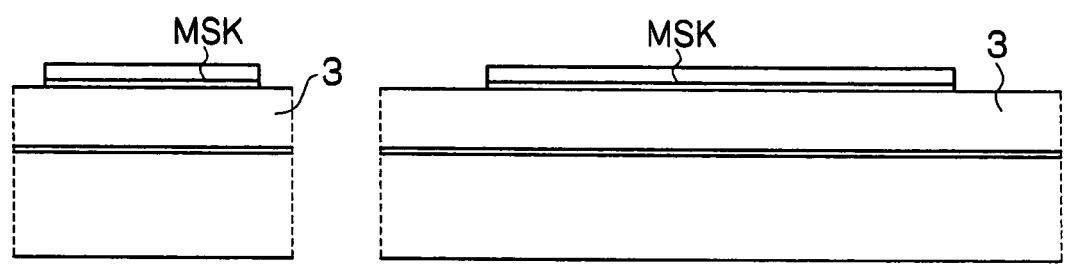
FIG. 3B is a process drawing illustrating the manufacturing method for the MMI device shown in FIG. 1A to FIG. 1C.

By using an ordinary photolithography technique, and a reactive ion etching technique using a gas mixture of $Cl_2$ and Ar, the mask layer 5 and the cap layer 4 are etched to form a mask pattern MSK with the mask layer 5 and cap layer 4 as shown in FIG. 3B. In FIG. 3A to FIG. 3D, although a plan view of the mask pattern MSK is not given, it has the same geometry as that of the surface of the cladding layer 3 as shown in FIG. 1A. In this case, the X-axis direction for the mask pattern MSK is set such that it corresponds to the crystal direction (0 1 1).

(3) Step 3

Figure 3C:
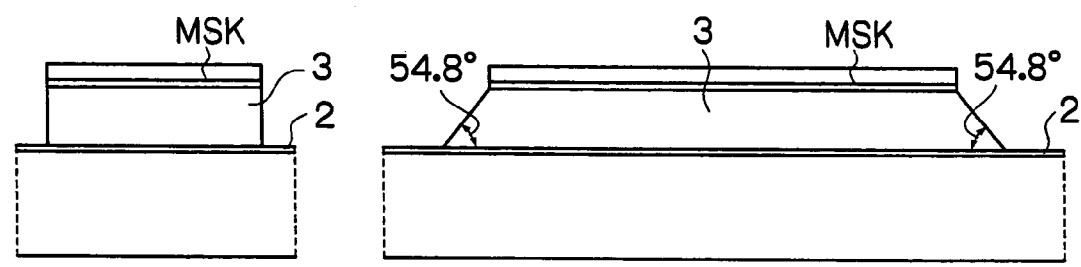
FIG. 3C is a process drawing illustrating the manufacturing method for the MMI device shown in FIG. 1A to FIG. 1C.

With the use of the mask pattern MSK as an etching mask, selective wet etching is performed using a liquid for selective etching, such as HCl, or the like, which etches the InP without etching the InGaAsP. In this selective wet etching, the InP of the cladding layer 3 is etched along the crystal plane. Therefore, as shown in FIG. 3C, the X1-X2 section of the cladding layer 3 corresponds to the crystal plane, providing an inclined face at approx. 54.8 deg with respect to the surface of the substrate 1. On the other hand, the Y1-Y2 section of the cladding layer 3 is formed perpendicularly. In addition, the light guiding layer 2 made of InGaAsP under the cladding layer 3 is not etched, being left as it is. The cap layer 4 constituting the mask pattern MSK has a good adhesion to the cladding layer 3, thus providing an effect of preventing an occurrence of side etching, which results from the selective etching liquid infiltrating between the mask pattern MSK and the cladding layer 3.

(4) Step 4

Figure 3D:
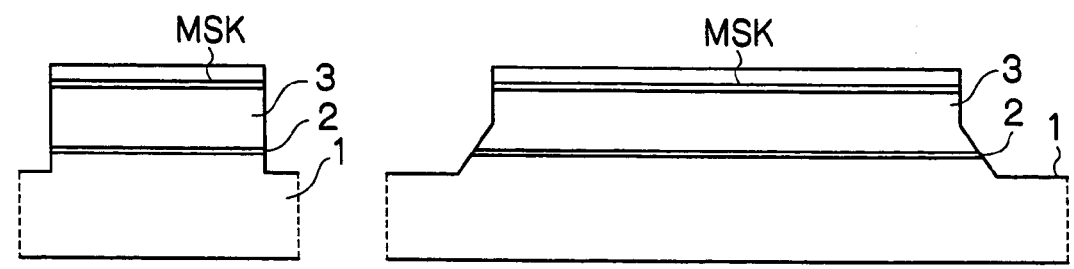
FIG. 3D is a process drawing illustrating the manufacturing method for the MMI device shown in FIG. 1A to FIG. 1C.

After the selective wet etching, the reactive ion etching using a gas mixture of $Cl_2$ and Ar is again performed. Thereby, with the sectional geometry as shown in FIG. 3C being maintained, the etching is progressed in the perpendicular direction, resulting in the cladding layer 3, the light guiding layer 2, and the substrate 1 being uniformly etched to be removed to the same thickness. At the time when the surface of the substrate 1 has been etched by about 1 to 3 μm, the etching is stopped. Thereby, the X1-X2 section of the lower side of the cladding layer 3, the light guiding layer 2, and a part of the substrate 1 provide an inclined face at about 54.8 degrees with respect to the surface of the substrate 1. In addition, the Y1-Y2 section of the light guiding layer 2 and the substrate 1 is formed perpendicularly. Thereby, the MMI device of the geometry shown in FIG. 3D is formed. Thereafter, by removing the mask pattern MSK, the MMI device as shown in FIG. 1A to FIG. 1C is completed.

With this MMI device, when it is used as a demultiplexer, for example, light guided by an optical fiber, light outputted from a laser diode, or the like, is introduced into the single-mode waveguide A through a lens. Light introduced into the light guiding layer 2 having an index of refraction of about 3.5 proceeds through this light guiding layer 2, while being totally reflected between the substrate 1 and the cladding layer 3, which have an index of refraction of about 3.1 and sandwich the light guiding layer 2. Further, in the multimode waveguide M having a broad width, the light is coupled into a plurality of multimodes, and is emitted into the single-mode waveguides C, D on the light emission side, being demultiplexed by the interference effect between those multimodes. At this time, a part of the light is reflected at the end face T2 forming an inclined face at about 54.8 degrees with respect to the surface of the substrate 1. The reflected light progresses toward the surface of the substrate 1, but because the incident angle with respect to this substrate 1 is small, almost all of the light is radiated into the inside of the substrate 1 without being reflected at the surface of the substrate 1. Therefore, the possibility that the light reflected at the end face T2 is returned to the single-mode waveguide A is eliminated.

In addition, this MMI device can also be used, for example, as a multiplexer with which different light beams are introduced into the single-mode waveguides A, B, respectively, and in the multimode waveguide M, these light beams are multiplexed to be outputted from the single-mode waveguides C, D. Also in this case, there is no possibility of the light reflected at the end face T2 being returned to the single-mode waveguides A, B.

Thus, because the MMI device in the present exemplary embodiment provides the end faces T1, T2 having an inclined face with respect to the surface of the substrate 1, the light which is reflected at these end faces T1, T2 is radiated to the outside through the substrate 1, which offers an advantage that there is no possibility that the light is returned to the single-mode waveguides A, B, resulting in the characteristics of the light source being adversely influenced.

In addition, the end faces T1, T2 having an inclined face are formed by the etching which utilizes the characteristics of the InP crystal constituting the substrate 1, the light guiding layer 2, and the cladding layer 3, thus an advantage is offered that the inclined face can be simply formed with no need for a complicated process.

The dimensions and materials as given in the above exemplary embodiment are one example, respectively, and according to a particular MMI device to which the present exemplary embodiment is to be applied, any appropriate dimension or material may be used.

In addition, the structure is not limited to that shown in the drawings. In other words, the number of single-mode waveguides provided on both sides of the multimode waveguide M is not limited to two for each. For example, in case of three branches, the multimode waveguide M may be configured to have one single-mode waveguide on the incident side, and three on the light emission side.

What is claimed is:

1. A manufacturing method for an optical multimode interference device comprising a multimode waveguide having one or more narrow width single-mode waveguides provided at both ends thereof, wherein light introduced into the one or more single-mode waveguides at an input side of the device is interfered within the multimode waveguide and emitted from the one or more single-mode waveguides at an output side of the device, the manufacturing method comprising:
    (a) on a crystal substrate which is a lower cladding layer, sequentially forming an optical waveguide layer, an upper cladding layer, and a mask layer for etching;
    (b) patterning the mask layer to form a mask pattern which corresponds to the multimode waveguide and the one or more single-mode waveguides;
    (c) selectively wet etching the upper cladding layer, using the mask pattern as a mask, to form the upper cladding layer such that, at both ends of said multimode waveguide, a wall face that is not provided with the one or more single-mode waveguides has a predetermined inclination angle along the crystal plane of the upper cladding layer; and
    (d) dry etching said upper cladding layer, said optical waveguide layer, and said crystal substrate using the mask pattern as a mask, to remove these layers to a predetermined thickness in a perpendicular direction, with the wall faces of the optical waveguide layer maintaining said predetermined inclination angle.

2. A manufacturing method for an optical multimode interference device comprising a multimode waveguide having one or more narrow width single-mode waveguides provided at both ends thereof, wherein light introduced into the one or more single-mode waveguides at an input side of the device is interfered within the multimode waveguide and emitted from the one or more single-mode waveguides at an output side of the device, the manufacturing method comprising:
    (a) preparing a substrate which is formed so as to have a plane as defined by a crystal direction (0 1 1) and a crystal direction (0 1-1);
    (b) on a surface of said substrate, sequentially forming a light guiding layer, a cladding layer, a cap layer, and a mask layer;
    (c) by using a photolithography technique and a reactive ion etching technique, etching said mask layer and said cap layer to form a mask pattern of the mask layer and cap layer;
    (d) by using said mask pattern as an etching mask, performing selective wet etching using a liquid for selective etching;
    (e) after said selective wet etching, performing a second reactive ion etching; and
    (f) removing said mask pattern after performing said second reactive ion etching.

3. The manufacturing method for an optical multimode interference device of claim 2, wherein a direction of light emission for said mask pattern is set so as to correspond to the crystal direction (0 1 1).

* * * * *